US007121372B2

(12) United States Patent
Braud

(10) Patent No.: US 7,121,372 B2
(45) Date of Patent: Oct. 17, 2006

(54) LIFT TRUCK WITH VARIABLE RANGE WITH AT LEAST THREE WHEELS

(75) Inventor: Marcel-Claude Braud, Ancenis (FR)

(73) Assignee: Manitou BF, Ancenis (FR)

( * ) Notice: Subject to any disclaimer, the term of this patent is extended or adjusted under 35 U.S.C. 154(b) by 215 days.

(21) Appl. No.: 10/401,858

(22) Filed: Mar. 31, 2003

(65) Prior Publication Data

US 2003/0226705 A1 Dec. 11, 2003

(30) Foreign Application Priority Data

Mar. 29, 2002 (FR) .................................. 02 04044

(51) Int. Cl.
*B60R 27/00* (2006.01)
*B60F 9/06* (2006.01)

(52) U.S. Cl. ...................... 180/210; 280/755; 180/271; 187/222; 187/224

(58) Field of Classification Search ........ 180/210–216, 180/271, 285; 280/755, 762, 763.1, 764.1, 280/765.1, 766.1; 187/222, 223, 224
See application file for complete search history.

(56) References Cited

U.S. PATENT DOCUMENTS 4,364,449 A * 12/1982 Knight et al. ............... 180/271
4,598,797 A * 7/1986 Schultz ....................... 187/223
6,378,545 B1 * 4/2002 Bozkan et al. ................ 137/82

FOREIGN PATENT DOCUMENTS

| | | | |
|---|---|---|---|
| DE | 17 80 525 | | 2/1972 |
| DE | 43 03 007 | | 6/1994 |
| DE | 19807849 | A1 * | 9/1999 |
| EP | 0 569 277 | | 11/1993 |
| EP | 0 701 963 | | 3/1996 |
| EP | 0 888 951 | | 1/1999 |
| EP | 0 953 540 | | 11/1999 |
| EP | 1 118 581 | | 7/2001 |
| GB | 2 265 344 | A * | 9/1993 |
| GB | 2 327 076 | | 2/1999 |
| JP | 2001-352612 | A * | 12/2001 |

* cited by examiner

*Primary Examiner*—Ruth Ilan
(74) *Attorney, Agent, or Firm*—Young & Thompson

(57) ABSTRACT

A lift truck with variable range with at least three wheels and a telescopic arm. The lift truck includes a steerable rear wheel and two front wheels, a driver station and a motor propulsion group secured to a chassis. The chassis has a compact configuration and is elongated in the longitudinal direction of advance of the truck, and has safety elements against the risk of loss of lateral stability. The safety elements are adapted to oppose turning over of the truck. The truck also includes a device to limit the maximum speed of advance based on a turning angle of the steerable wheel.

3 Claims, 5 Drawing Sheets

LIFT TRUCK WITH VARIABLE RANGE WITH AT LEAST THREE WHEELS

BACKGROUND OF THE INVENTION

The invention relates to a motor driven lift truck, with variable range, in which the front end of the telescopic arm extends in front of the front wheels in the load carrying position.

The invention is particularly useful as a lift truck with variable range with three wheels.

There are known trucks with variable range with three wheels sold by the French company MANITOU BF under the name TMT: these trucks with variable range with three wheels have a U-shaped chassis, so as to be able to retract a load within the U-shaped chassis in the transport position. These trucks are particularly adapted to be loaded on the rear of a carrying vehicle, as is described in EP0 701 963.

Because of the particular structure of the TMT trucks adapted to be loaded on the rear of a carrying vehicle, these trucks have the drawback of a wide front track of the order of 2 meters and a short wheelbase of the order of 1.40 meter. This structure also has the drawback of a relatively short telescopic arm, permitting reaching a lifting height of the order of 3 meters.

Because of their particular structure permitting retracting the load within the U-shaped chassis in the transport position, these TMT trucks adapted to be loaded on the rear of a carrying vehicle have good lateral stability when turning.

SUMMARY OF THE INVENTION

A first object of the invention is to provide a new lift truck with variable range, with at least three wheels, having a chassis structure permitting a wide variety of uses.

A second object of the invention is to provide a new lift truck with variable range, with at least three wheels, of simple and economical structure, having a telescopic arm of notable length, permitting achieving a substantial lifting height.

A third object of the invention is to provide a new lift truck with variable range, with at least three wheels, in which the front end of the telescopic arm extends in front of the front wheels in the load transport position, and having good lateral stability when turning.

A fourth object of the invention is to provide a new lift truck with variable range, with at least three wheels, in which the front end of the telescopic arm extends in front of the front wheels in the load transport position, having good lateral stability when turning without requiring the intervention of the operator in the driver's seat.

The invention has for its object a lift truck with variable range, with three wheels and a telescopic arm, in which the front end of the telescopic arm extends in front of the front wheels in the load transport position, of the type comprising a steerable rear wheel and two front wheels, a driver station and a motor propulsion group secured to a chassis, characterized in that the chassis has a compact configuration elongated in the longitudinal direction of advance of the truck.

According to other alternative characteristics of the invention:

- the chassis has two shoes for limiting lateral inclination, disposed on opposite sides of the rear wheel of the truck,
- the lateral inclination limiting shoes are disposed preferably in the tracks of the front wheels, when the truck advances in a straight line,
- the truck has a hydrostatic transmission and comprises a system limiting the maximum speed of advance as a function of the wheel angle of the truck, so as to ensure the lateral stability of the truck when turning.

The invention also has for its object a lift truck with variable range, with at least three wheels and a telescopic arm, in which the front end of the telescopic arm extends in front of the front wheels in the load carrying position, of the type comprising at least one steerable rear wheel and two front wheels, a driver station and a motor propulsion group secured to a chassis, characterized in that the truck comprises a system limiting the maximum speed of advance as a function of the wheel angle of the truck, so as to ensure lateral stability of the truck when turning.

According to other alternative characteristics of the invention:

- the truck has a hydraulic transmission and said system limiting the maximum speed of advance as a function of the wheel angle of the truck is connected to or coacts with the hydrostatic transmission of the truck.
- the system limiting the maximum speed of advance of the truck is controlled by an actuator connected to the wheel angle of at least one steerable wheel,
- the actuator can be secured to a steering jack for the truck, or, alternatively, the actuator can be secured to a steerable wheel support or pivot,
- the system limiting the maximum speed of advance as a function of the wheel angle comprises a valve for reducing the control pressure of the hydrostatic transmission of the truck,
- said control pressure reduction valve is a valve with a tappet coacting with an actuator connected to the wheel angle of the truck,
- the control pressure decreases as a function of the outlet of the tappet of the control pressure reduction valve.

BRIEF DESCRIPTION OF THE DRAWINGS

The invention will be better understood from the description which follows, given by way of non-limiting example, with reference to the accompanying drawings, in which.

DETAILED DESCRIPTION OF THE PREFERRED EMBODIMENTS

Figure 1:
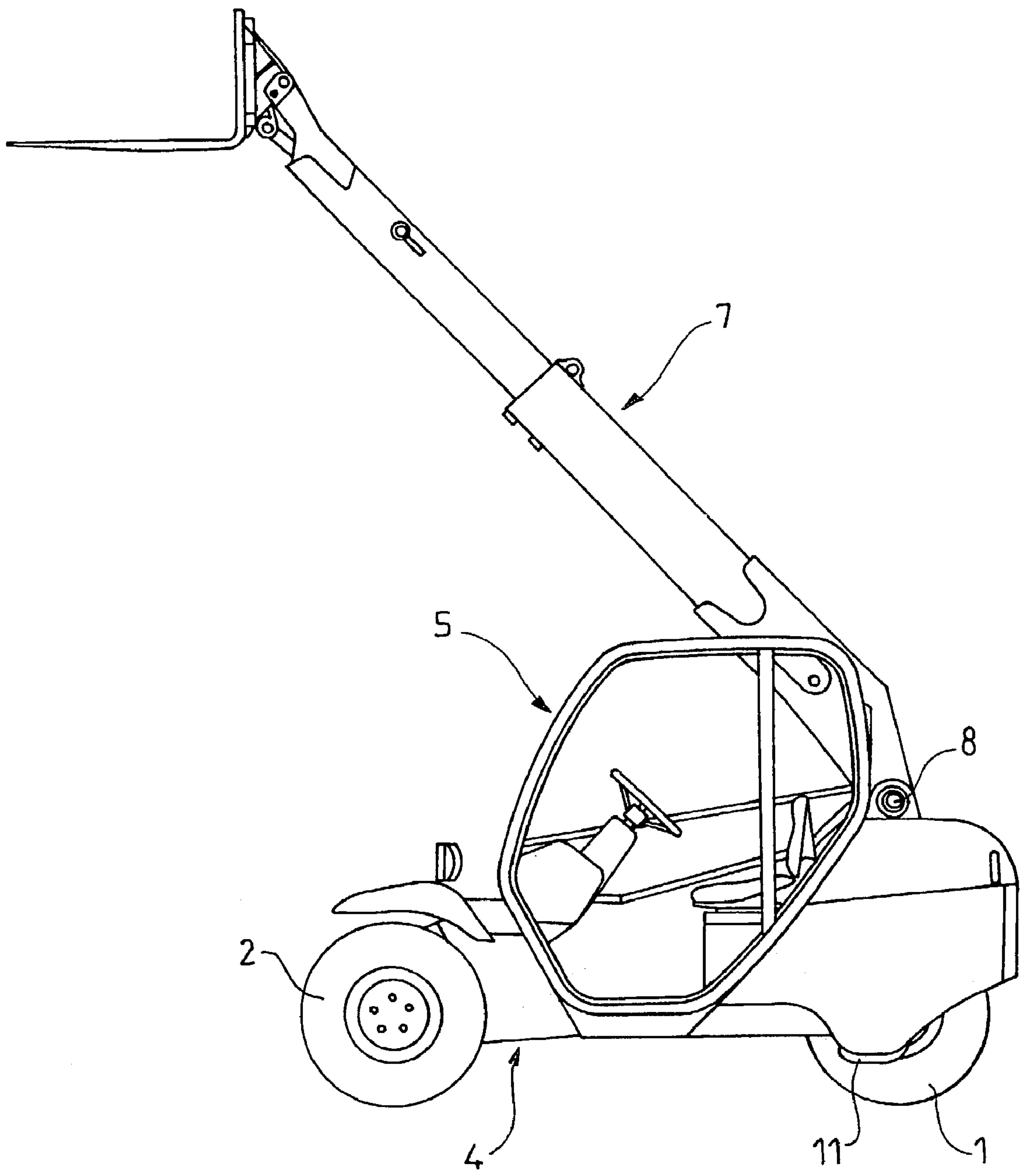
FIG. 1 shows schematically a side elevational view of the left side of a lift truck according to the invention.
Figure 2:
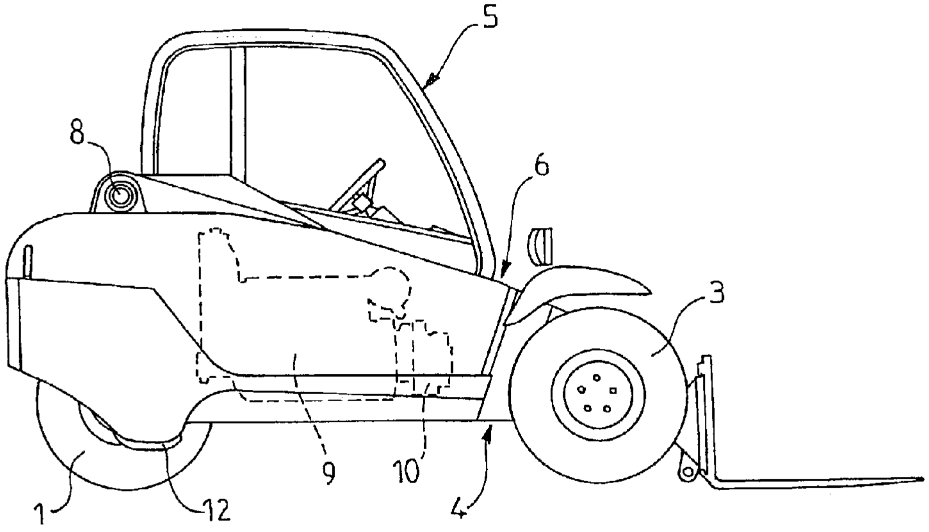
FIG. 2 shows schematically a side elevational view from the right side of a lift truck according to the invention.

With reference to FIGS. 1 and 2, a lift truck with three wheels according to the invention comprises a steerable rear wheel 1 which is preferably motor driven, a front left wheel 2 which is preferably motor driven and of fixed direction, and a right front wheel 3 which is preferably motor driven and of fixed direction.

The three wheels 1 to 3 are mounted on a chassis 4 carrying a drive station 5 located to one side of the truck and an engine housing 6 located on the side opposite the driver station 5 relative to a telescopic arm 7 mounted pivotally under the action of a lifting jack about a substantially horizontal axle 8 located to the rear of the chassis 4 substantially above the rear steerable and motor driven wheel 1.

The motor housing 6 contains a motor propulsion group 9 comprising an internal combustion engine and driving at least one hydrostatic pump 10 supplying the hydraulic energy to the drive systems for the wheels of the truck according to the invention. The motor propulsion group 9 drives, in a manner known per se, other hydraulic pumps to supply the actuators of the handling means and systems for steering the wheels.

The chassis 4 preferably comprises two shoes 11 and 12 located substantially in the track of the front wheels 2 and 3 to limit the angle of lateral tilting of the truck, and to increase the lateral stability of the truck, particularly when turning.

Preferably, the truck according to the invention is a compact truck having an overall width of about 1.60 meter and a cabin height of about 1.90 meter. The floor of the cabin of the driver station 5 is a lowered floor that is directly accessible without an intermediate step.

The clearance of the truck according to the invention is about 30 cm, so as to permit use in all terrain, except for the shoes 11 and 12 to limit the lateral inclination located in the tracks of the front wheels 2 and 3.

The shoes 11 and 12 which locally limit the clearance, are safety shoes permitting bearing on the ground in the case of loss of lateral stability, so as to prevent the truck according to the invention from turning over.

The engine housing for protecting the motor propulsion group 9 has a downwardly forwardly inclined profile, below the level of the right side window of the driver station 5, so as to permit total all-around visibility for the driver seated in the driver station 5.

The truck according to the invention has a ratio of wheelbase to front track greater than 1 in contrast to the TMT trucks of known type, adapted to be loaded on the rear of a carrying vehicle.

In the maximum retraction position of the boom shown in FIG. 2, the working accessory carried by the telescopic arm 7 extends forwardly beyond the front wheels 2 and 3, thereby permitting receiving a telescopic arm 7 having substantial range and lifting height, very much greater than the range and lifting height of the TMT trucks of known type.

However, on this three-wheel truck of short width, a risk of lateral instability exists, particularly when turning, which requires the use of suitable means such as the shoes 11 and 12 for limiting the lateral inclination.

Also, in the case of excessive forward speed, and in the case of other trucks with at least three wheels, for example with four wheels, this risk of lateral instability is further increased, particularly when turning, because of the increase of the inertial forces exerted on the machine proportional to the square of the speed of advance and inversely proportional to the turning radius.

So as further to improve the safety of operation and the lateral stability of a truck according to the invention, it is desirable to provide a limitation of the maximum speed of advance when turning.

Figure 3:
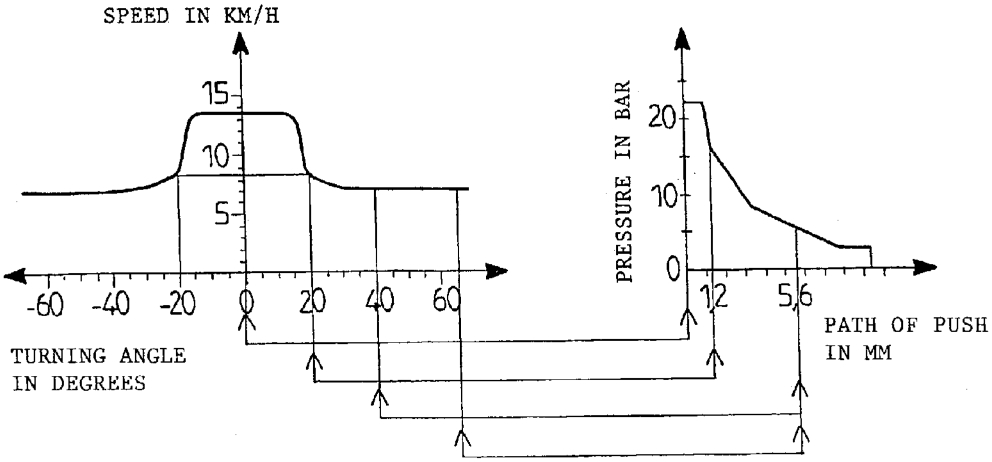
FIG. 3 shows schematically an example of the reference curve of maximum speed of advance as a function of the wheel angle of the rear wheel of a lift truck according to the invention.

To this end, in FIG. 3, a curve of maximum speed of advance as a function of the wheel turning angle in degrees, of a steerable wheel, for example a rear wheel, is shown.

To advance in a straight line, and up to a wheel turning to the right or left of about 10°, the maximum speed of a truck according to the invention is limited to a speed of the order of 13.5 km/h.

Beyond a wheel turning angle greater than 10° to the left or right, for example for a wheel turning angle of 20°, the maximum speed per minute decreases sharply to a value of about 8.5 km/h.

Beyond a wheel turning angle of 20° and up to a wheel turning angle of about 40°, the speed of turning decreases more slowly to a value of about 7 km/h, beyond a wheel turning angle of 40° to the left or right up to a final wheel turning angle of 65° to the right or left, the maximum speed permitted for the truck remains equal to 7 km/h.

This speed limitation is obtained by regulation of the hydrostatic flow rate of the truck according to the invention, preferably by acting on the control pressure of the hydrostatic pump.

To reduce the control pressure of the hydrostatic transmission, there is preferably used a pressure reduction valve analogous to a slow advance or inching valve. This pressure reduction valve is controlled by a tappet whose path corresponds to the angle of wheel turning, as indicated by the corresponding arrows of FIG. 3.

It will be seen that for advancement in a straight line, the control pressure is maximum at about 22 bars, whilst for a maximum wheel turning angle, the control pressure is equal to 5 bars, corresponding to a throw of the tappet equal to 5.6 mm. The intermediate values of 20° and 40° of angle of turning correspond respectively to a tappet throw of 1.2 mm and 5.6 mm.

FIGS. 4 to 7 disclose a first system of wheel turning of a steering wheel, for example a rear wheel 1.

The steering axle 20 of the support 21 carrying a steerable wheel, for example a rear wheel 1, is secured to the chassis 4 not shown.

The support 21 for the rear wheel 1 comprises a projection 22 subject to the axis of a jack 23 mounted between the articulation 24 on the support 21 and an axle 25 secured to the chassis 4 not shown.

The jack 23 carries an actuator 26 constituted for example by a rod 27 secured to the jack 23 and an adjustable pressure screw 28. The adjustable screw 28 acts on a socket 29 for pushing back a tappet 30 of the valve 31 for pressure reduction. The pressing back socket 29 is slidably mounted in a bore of a plate secured to the valve 31 for reduction of control pressure.

Figure 4:
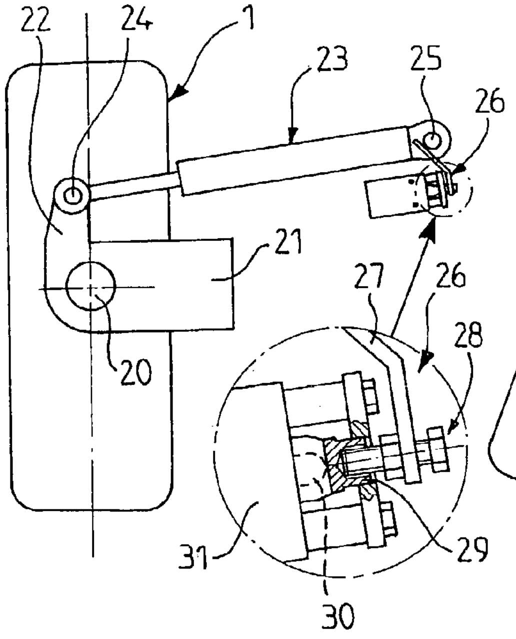
FIGS. 4 to 7 shows schematically views from above of a first wheel turning system of a lift truck according to the invention adapted to observe a maximum reference speed of the type shown in FIG. 3.

Thus, in the position for advancement in a straight line shown in FIG. 4, the tappet 30 is entirely sunk within the valve 31, which corresponds to a pressure of 22 bars and a maximum permitted speed of advance of 13.5 km/h (FIG. 3).

Figure 5:
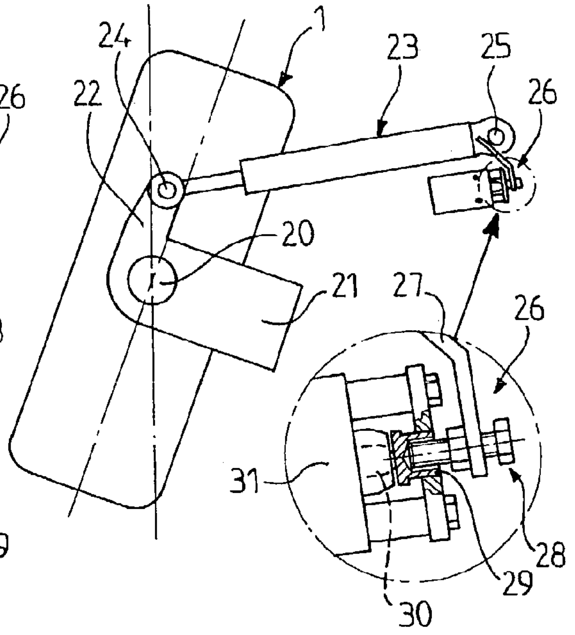

In FIG. 5, for a wheel turning angle of 20°, the tappet 30 exits by 1.2 mm, which corresponds to a control pressure of about 16 bars and a maximum permitted speed of advance of 8.5 km/h.

Figure 6:
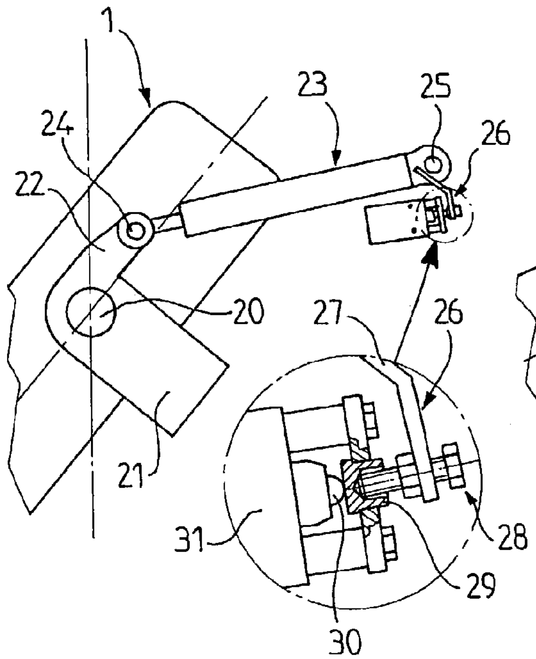

In FIG. 6, for a wheel turning angle of 40°, the tappet has emerged by 5.6 mm, which corresponds to a control pressure of 5 bars and a maximum permitted speed of advance of 7 km/h.

Figure 7:
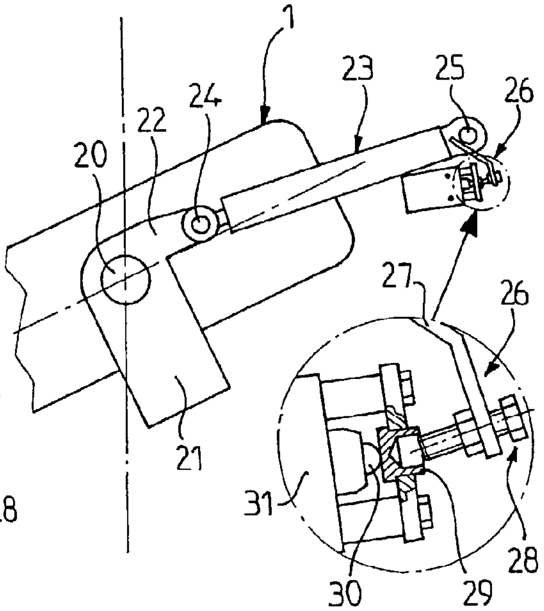
Figure 8:
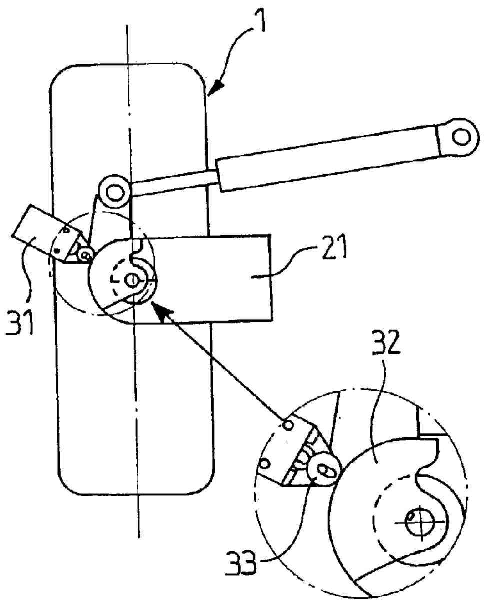
FIGS. 8 to 11 show schematically views from above of another wheel turning system of a lift truck according to the invention adapted to observe a maximum reference speed of the type shown in FIG. 3.
Figure 9:
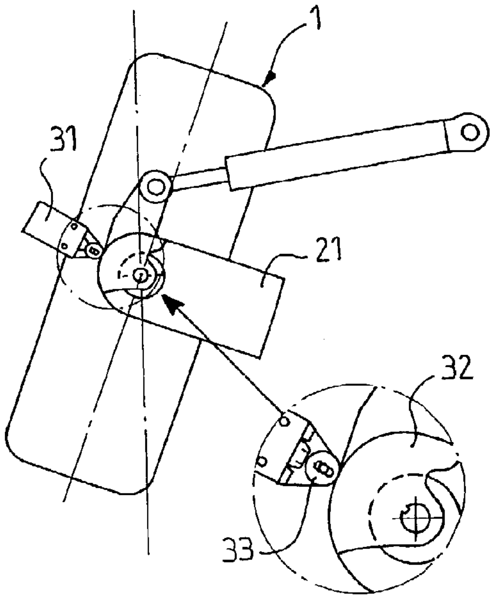
Figure 10:
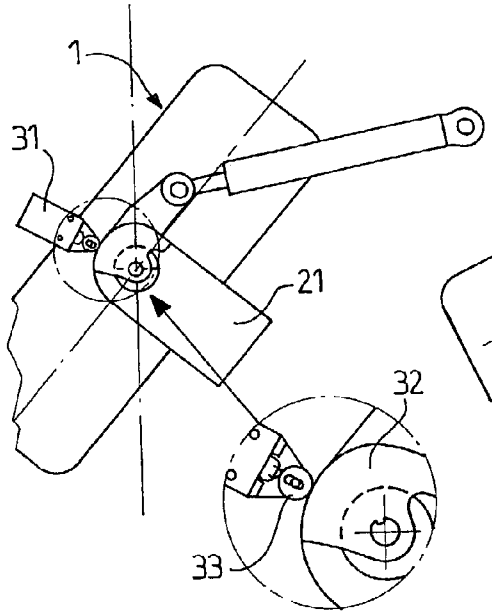
Figure 11:
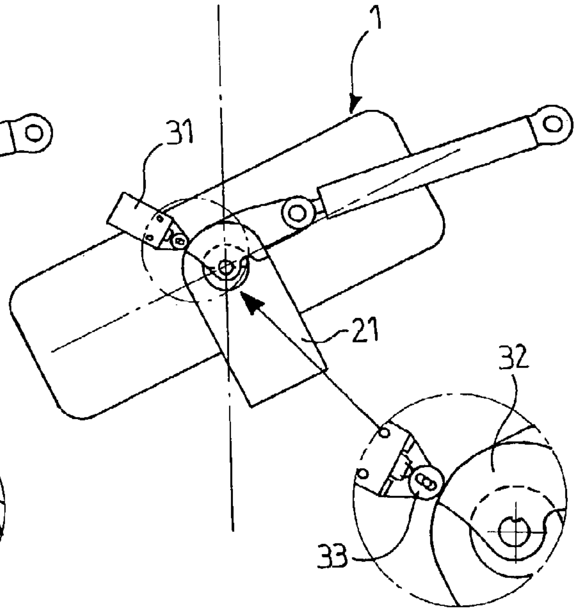

In FIG. 7, for a wheel turning angle of 65°, the tappet also remains extended by 5.6 mm, because of the limitation of this path by the abutment of the sliding socket 29, which corresponds to a control pressure of 5 bars and a maximum permitted speed of advance of 7 km/h.

With reference to FIGS. 8 to 11, another system for steering and speed limitation as a function of the wheel turning angle is shown with wheel turning angles respectively identified with the angles of wheel turning described with reference to FIGS. 3 to 7.

The movement of the tappet, the control pressures and the maximum permitted speeds are in this example identical to the movements of the tappet, to the angles of wheel turning and to the maximum permitted speeds described with references to FIGS. 3 to 7.

Of course, any other device for speed limitation of advance of the truck can also be envisaged, without departing from the scope of the present invention.

In this second system, a cam 32 is mounted secured to the support 21 of the rear wheel 1, so as to act on a sliding roller 33 for pressing in the tappet 30 of the value 31 for reduction of control pressure.

There is thus obtained, thanks to the action of cam 32 on roller 33 for pressure in the tappet 30, the movement of the tappet, the corresponding reductions of control pressure and the limitations of maximum speed of advance described with reference to FIG. 3.

Figure 12:
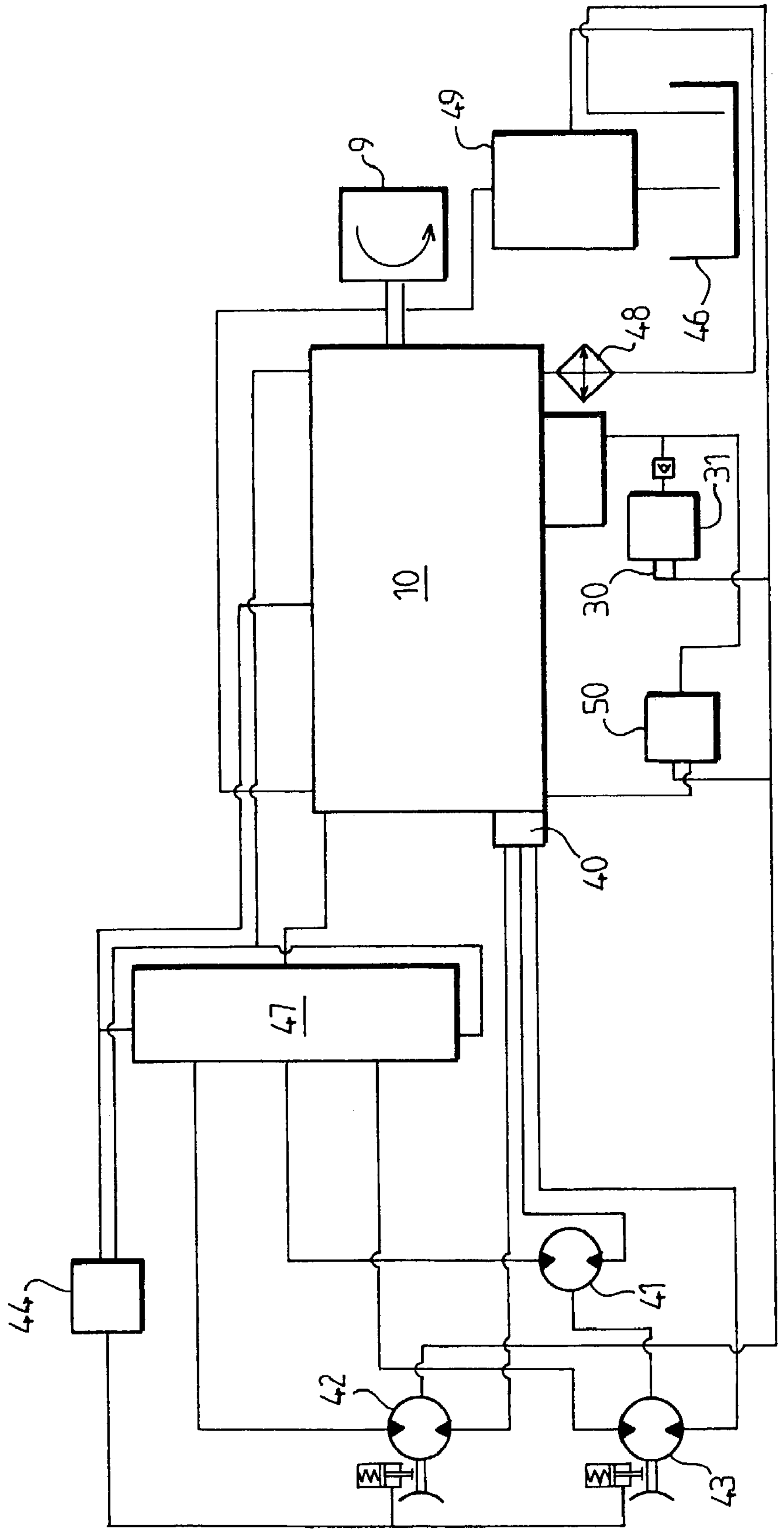
FIG. 12 shows schematically a hydraulic transmission diagram of a lift truck according to the invention adapted to observe a maximum reference speed of advance of the type shown in FIG. 3.

In FIG. 12, a hydraulic diagram for forward movement of a truck according to the invention is shown.

The motor 9 drives the hydrostatic pump 10 generating the hydrostatic energy of the truck.

The hydrostatic pump 10 is connected to a distributor block 40 for supplying the motor 41 for driving a steerable wheel, for example a rear wheel; the motor 42 for driving the right front wheel; and the motor 43 for driving the left front wheel.

An braking electro-distributor 44 acts on the hydraulic fluid returns to the reservoir 46 to control the braking of the driven wheels of the truck according to the invention. A flow rate distributor 47 ensures distribution of the flow rate between the three wheels to avoid any skidding or slipping.

In an known manner, a cooler 48, a filter 49 for air and for the return of hydraulic fluid and a slow advance or inching valve 50 actuated by a pedal, are mounted in the hydrostatic circuit to perform functions known per se.

The valve 31 for the reduction of control pressure of the hydrostatic pump 10 described with reference to FIGS. 4 to 11 is actuated by the tappet 30 as a function of the wheel turning angle of the rear wheel 1.

Other variations of hydraulic diagram for a lift truck with at least three wheels according to the invention can be envisaged without departing from the scope of the present invention, the essential point being to fix a reference maximum permitted speed of advance of the truck as a function of an individual or mean value representative of the wheel turning angle.

The invention described with reference to several particular embodiments is not thereby limited in any way, but on the contrary covers all modifications of shape and modification of construction within the scope and spirit of the invention.

Other modifications of arrangement of the lift truck with at least three wheels according to the invention can be envisaged without departing from the scope of the present invention, the essential point being to provide safety means against the risk of loss of lateral stability, these safety means being adapted to prevent overturning of the truck according to the invention.

The invention claimed is:

1. Lift truck with at least three wheels and a telescopic arm, a front end of the telescopic arm extends in front of the front wheels in a load transport position, said truck comprising:

one steerable rear wheel and two front wheels;

a driver station and a motor propulsion group secured to a chassis, said telescopic arm comprising a first hollow shaft and a second shaft slidable within said first shaft, wherein the truck comprises a system limiting the maximum speed of advance as a function of a wheel turning angle of the rear wheel of the truck, so as to ensure the lateral stability of the truck when turning, wherein the truck has a hydraulic transmission, wherein said system limiting the maximum speed of advance as a function of the wheel turning angle of the truck is connected to or coacts with the hydraulic transmission of the truck, wherein the system limiting the maximum speed of advance as a function of the wheel turning angle comprises a control pressure reduction valve for the hydraulic transmission of the truck, and wherein said control pressure reduction valve is a valve with a tappet coacting with an actuator connected to the rear wheel of the truck.

2. Device according to claim 1, wherein the control pressure decreases as a function of the outlet of the tappet of the control pressure reduction valve.

3. A lift truck, comprising:

a chassis;

at least one steerable rear wheel and two non-steerable front wheels connected to said chassis;

a telescopic arm connected to said chassis;

a driver station and a motor propulsion group secured to said chassis, said motor propulsion group driving said rear wheel and said two front wheels;

a hydraulic transmission; and a system controlling a speed of advance of the truck as a function of a turning angle of said at least one steerable rear wheel, so as to ensure the lateral stability of the truck when turning, said system being connected to said hydraulic transmission, wherein said system comprises a control pressure reduction valve coacting with an actuator connected to the rear wheel of the truck.

* * * * *